United States Patent
Nye

[11] 3,843,056
[45] Oct. 22, 1974

[54] TRICKLE IRRIGATION SYSTEM

[76] Inventor: John R. Nye, 3574 Hollywood Rd., St. Joseph, Mich. 49085

[22] Filed: Nov. 30, 1973

[21] Appl. No.: 420,626

[52] U.S. Cl............. 239/64, 137/624.11, 239/68, 239/70, 239/71
[51] Int. Cl............................................. A01g 25/02
[58] Field of Search ....................... 239/63–65, 239/67, 68, 70, 71, 450, 542; 137/624.11, 624.12, 624.27

[56] References Cited
UNITED STATES PATENTS

| | | | |
|---|---|---|---|
| 2,721,101 | 10/1955 | Richard, Jr. ........................ | 239/64 |
| 3,372,286 | 3/1968 | Rotunda ........................... | 239/70 X |
| 3,386,460 | 6/1968 | Dean................................ | 239/70 X |
| 3,599,867 | 8/1971 | Griswold et al.................... | 239/63 |
| 3,653,595 | 4/1972 | Greengard, Jr. et al............. | 239/70 |
| 3,747,620 | 7/1973 | Kah, Jr. ........................... | 137/624.12 X |

Primary Examiner—Lloyd L. King
Assistant Examiner—Andres Kashnikow
Attorney, Agent, or Firm—Ohsch & Knoblock

[57] ABSTRACT

A trickle irrigation system which includes a water supply source connected by a flow control unit to a field of discharge pipes. The flow control unit includes a pump and a first switch connected to a power source for actuating the pump. A water flow responsive switch which constitutes a part of the flow control unit serves upon a specified reduction of water flow through the system to deactivate or shut off the pump. A time delay switch which also constitutes a part of the flow control unit serves to isolate or deactivate the flow responsive switch for a selected period of time upon initial actuation of the pump.

7 Claims, 4 Drawing Figures

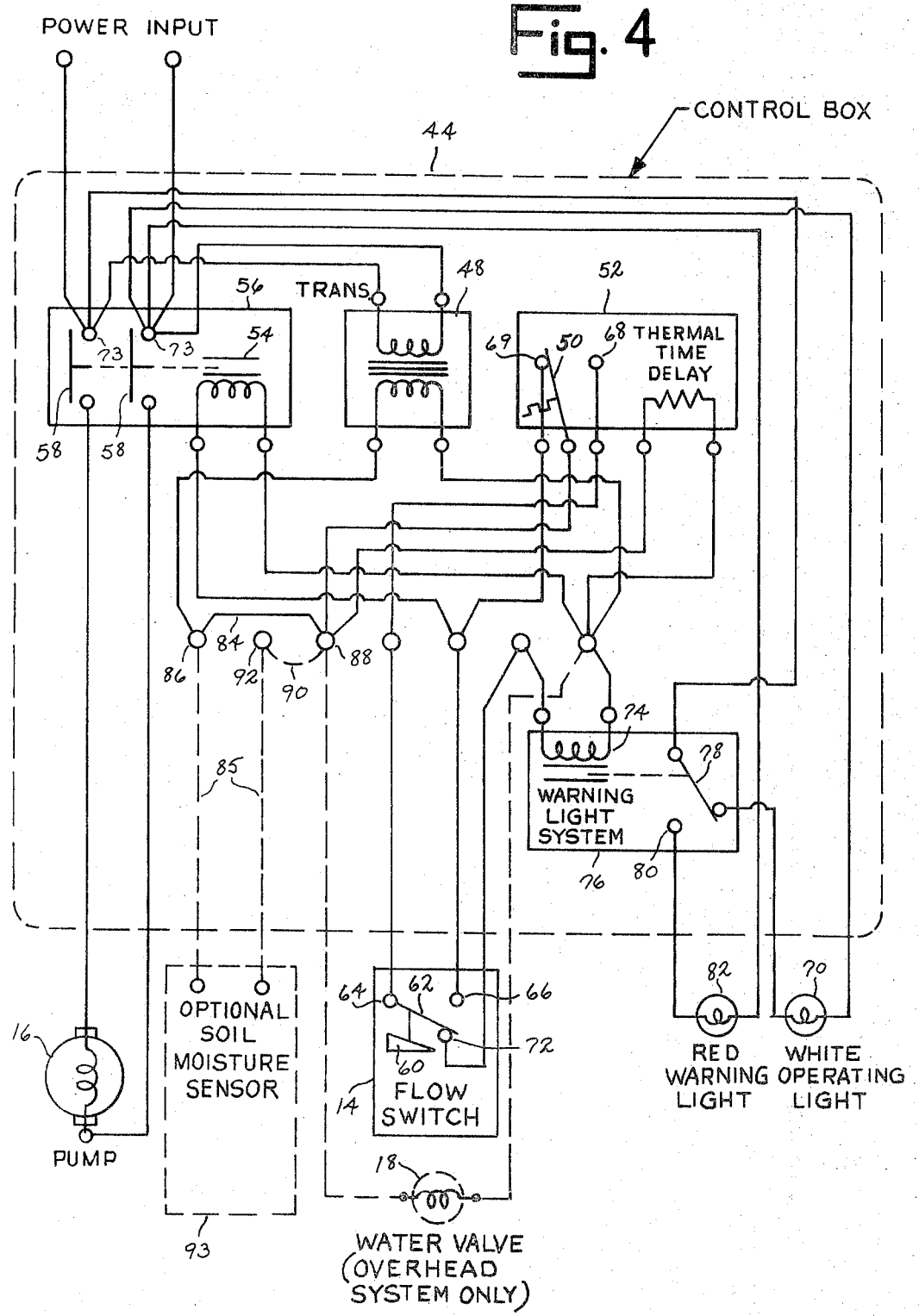

3,843,056

TRICKLE IRRIGATION SYSTEM

SUMMARY OF THE INVENTION

This invention relates to an irrigation system and will have specific application to a compact control unit for a trickle type irrigation system.

The irrigation system of this invention includes a water supply source and a field of discharge pipes for dispensing water from the supply source over the ground about growing crops. A pump is interconnected between the water supply source and the discharge pipe field. A first switch connects an electrical power source to the pump with the switch having an "on" position for actuating the pump and an "off" position to deactivate the pump. A second switch which includes means responsive to the rate of water flow through the pump or system will cause the pump to be deactivated with the first mentioned switch remaining in its "on" position when the water flow drops below a selected minimal flow rate. Also included is a means which isolates or deactivates the second or flow responsive switch for a short period of time when the first switch is initially shifted into its "on" position to start the pump. This allows the irrigation system to be primed and air-purged without deactivation of the pump.

The control unit for the irrigation system is contained within a compact housing member which is adapted to rest upon the ground. Within the housing member is the pump, both aforementioned first and second switches, the means for deactivating the second or flow responsive switch, a metering device for regulating the rate of fluid flow through the system and onto the ground, and a warning means, such as a light indicator, which serves to note when the pump is deactivated through the operation of the second or flow responsive switch.

By means of the above described trickle irrigation system, a controlled minimum amount of water can be applied to the ground about the crops for the purpose of supplementing rain fall and to replenish water lost through evaporation. Accordingly, it is an object of this invention to provide a system of trickle irrigation which is of economical operation.

Another object of this invention is to provide a trickle irrigation system having compactly housed controls and which is of simple installation.

Still another object of this invention is to provide a trickle irrigation system which can be used with either a sub-level or a gravity fed water supply source.

Still another object of this invention is to provide a control means for an irrigation system in which the pump, metering and timing devices, strainers, electrical wiring and safety controls therein are housed in one weather-proof, compact housing member.

Other objects of this invention will become apparent upon a reading of the invention's description.

BRIEF DESCRIPTION OF THE DRAWINGS

FIG. 4 is a schematic circuit diagram of the control elements of the trickle irrigation system.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

Figure 1:
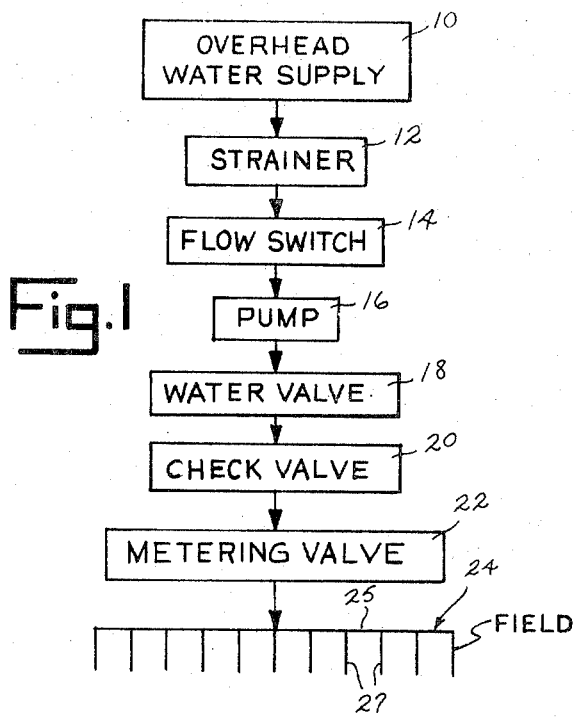
FIG. 1 is a flow diagram of the trickle irrigation system being utilized with an overhead water supply.

In FIG. 1 overhead water supply 10, which may consist of an elevated water storage tank and which may contain fertilizer, is connected to a discharge field 24 through a strainer 12, a flow switch 14, a pump 16, a water valve 18, a check valve 20, and a metering valve 22. Field 24 may consist of a transverse header pipe 25 from which lateral pipes 27 extend into a crop area. The lateral pipes 27 are preferably slightly elevated and have small openings therein which permit the water to drip onto the underlying ground. Pump 16 maintains a selected discharge pressure within field 24. When watering adult trees in an apple or peach orchard the water pressure in field 24 may be eight to ten pounds per square inch for delivering one to two gallons of water per hour per tree.

Figure 3:
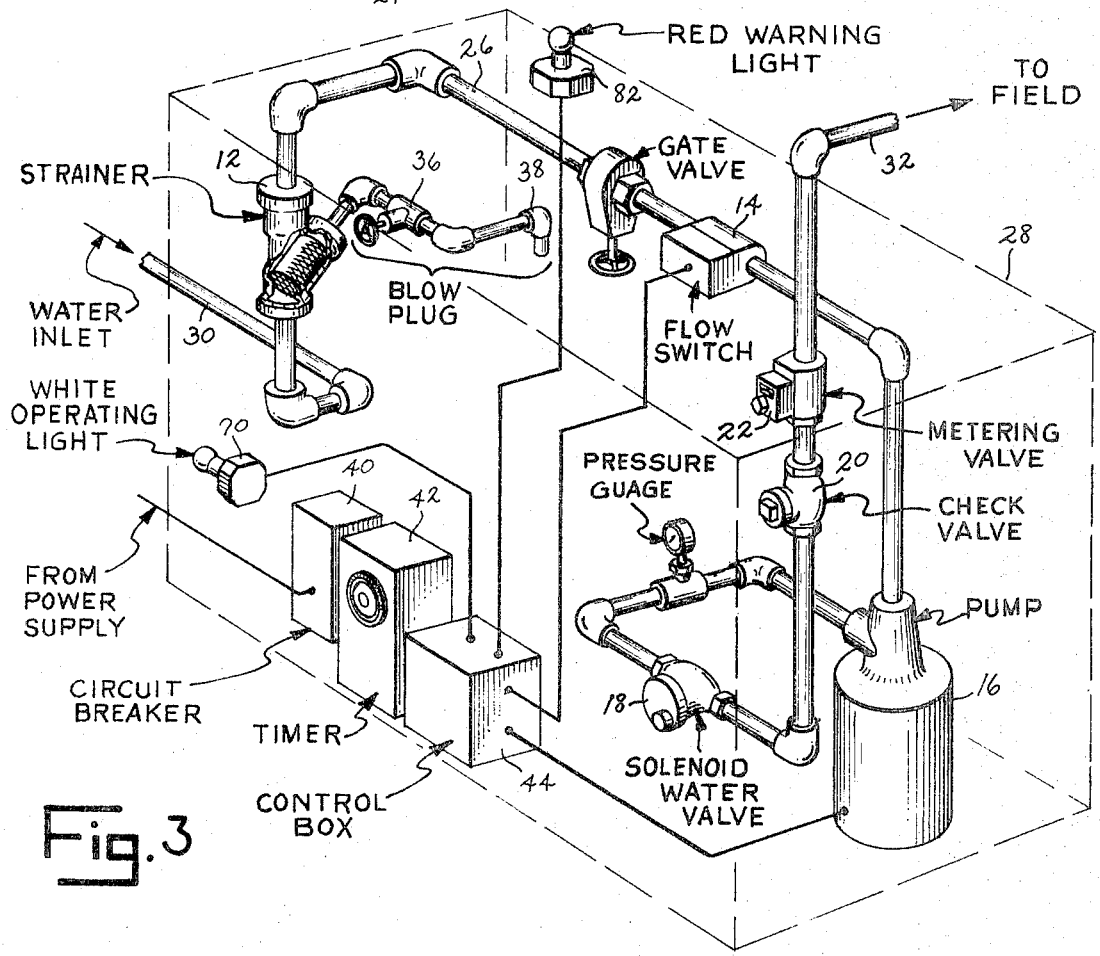
FIG. 3 is a perspective view of the interior of the housing member containing the controls of the trickle irrigation system as utilized with an overhead water supply.

Strainer 12, flow switch 14, pump 16, water valve 18, check valve 20 and metering valve 22 are all series connected by means of a conduit 26 and are housed with certain electrical actuating components within a housing member shown in broken lines in FIG. 3 and designated by the reference numeral 28. Housing 28, which may be formed of a weather-resistant material such as steel or fiberglass, is adapted to rest upon the ground adjacent the crop area. In some constructions of this invention, housing 28 may be rectangular and of a size no greater than 18 inches wide, 30 inches long, and 22 inches high. This size permits housing 28 to be moved to the crop area and installed in a rapid manner with minimum difficulty. Strainer 12 is connected to water supply 10 by an inlet conduit 30, and metering valve 22 is connected to the header pipe 25 of field 24 by an outlet conduit 32.

Figure 2:
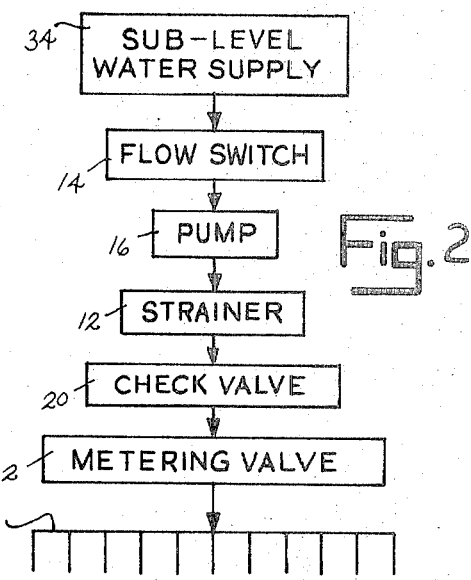
FIG. 2 is a flow diagram of the trickle irrigation system being utilized with a sub-level water supply.

In FIG. 2, the trickle irrigation system is adapted to accommodate a sub-level water supply 34 which may constitute a pond or lake and which is connected to field 24 through flow switch 14, pump 16, strainer 12, check valve 20 and metering valve 22. A screen preferably covers the inlet at water supply 34 to prevent debris and other contaminents from entering the irrigation system. In comparing the flow diagrams in FIGS. 1 and 2 it is to be noted that strainer 12 is located before flow switch 14. when an overhead water supply 10 is used and after pump 16 when a sub-level water supply 34 is used. This is because strainer 12 is of the type which can be purged of debris by the opening of a valve 36 during operation of pump 16 to flush the screen of the strainer and force the debris therefrom out through a conduit 38 and onto the ground. When utilizing strainer 12 in a system having a sub-level water supply 34, the prime to the pump would be lost upon opening of valve 36 if the strainer were positioned between the pump and water supply. Therefore, in a sub-level water supply source system, the strainer is located after the pump with a foot or similar type check valve being utilized at the water inlet to maintain the pump prime. A water valve 18 is utilized in the overhead water supply source type system to prevent gravity induced flow of the water through the system when pump 16 is turned off. Valve 18 would not be necessary when utilizing a sublevel water supply 34. Check valve 20 utilized in both of the systems of FIGS. 1 and 2 is for the purpose of preventing the reverse flow of water from field 24 into the pump and other parts of the system and reducing back pressure on the pump to ease starting of the pump motor. Metering valve 22 utilized in the systems of FIGS. 1 and 2 regulates the water pressure and flow rate so that the user of the system can precisely control the amount of water being discharged from field 24 onto the ground about the crop area. A description of the operative purpose of flow switch 14 also utilized in both the systems of FIGS. 1 and 2 will be found in the following operational description of the systems.

Referring to FIGS. 3 and 4, current from a suitable power source, such as a commercially available power line, enters housing 28 passing first through a circuit breaker 40, then through a timer switch 42, and into a control box 44. Timer switch 42 permits the user of the irrigation system to start and stop the watering cycle at selected predetermined time intervals which generally will be no greater than 12 hours of each 24-hour day. As the current enters control box 44, it first passes through a transformer 48, assuming a commercial line voltage of 120 or 220 volts is being used, which reduces the voltage to a suitable operating level, such as in the order of 24 volts. The current from transformer 48 passes through a normally closed contact 50 in a thermal time delay switch 52 and from there into a solenoid 54 in a switch 56 which causes contacts 58 of the switch to close and actuate electric pump 16.

Upon actuation of pump 16, water is drawn from water supply source 10 or 34 passing first through flow switch 14. Flow switch 14 includes a means, such as float 60, located within conduit 26, which is responsive to the rate of fluid flow through conduit 26. A contact 62 associated with float 60 of flow switch 14 is pivoted about junction 64 from the position illustrated in FIG. 4 into contact with an upper junction 66 as the water flow through conduit 26 upon actuation of pump 16 reaches a certain rate which is within the desired operating range of the irrigation system. While movement of contact 62 into engagement with junction 66 will occur within a short time after pump 16 is started, no current will pass immediately between junctions 64 and 66 and through switch 14 due to the presence of time delay switch 52.

Switch 52 shown in FIG. 4 is of the thermal type time delay which upon the start of pump 16 requires approximately one to two minutes to sufficiently heat to cause contact 50 to be drawn into contact with junction 68 and disengaged from contact 69 in the switch. When contact 50 engages junction 68 of switch 52, current from transformer 48 is caused to pass through flow switch 14 with its contact 62 thereof being held in engagement with junction 66 due to the water flow through the pump. The current passing through switch 14 serves to continuously energize solenoid 54 in switch 56, thereby causing contacts 58 to remain closed. Simultaneously with the introduction of current into control box 44 from the outside power source, a white light 70 which is attached to the outside of housing member 28 is lit indicating that pump 16 is working and that waterflow has begun into field 24.

If during the operation of pump 16 the water flow through pump 16 is interrupted or reduced below a selected flow rate for any reason, such as a blockage in the inlet conduit 30 at the water supply source or in outlet conduit 32 at field 24, float 60 within flow switch 14 will gravitationally sink, causing contact 62 to be disengaged from junction 66 and engaged with junction 72 in the switch. Once contact 62 is disengaged from junction 66 in the flow switch, current flow into solenoid 54 of pump control switch 56 is terminated to cause contacts 58 in the switch to be disengaged from power supply junctions 73, thereby stopping pump 16. Nearly simultaneously, the engagement of contact 62 with junction 72 in flow switch 14 activates a solenoid 74 in another switch 76 which causes the contact 78 therein to be shifted into engagement with a junction 80, extinguishing white light 70 and causing a red light 82 also carried exteriorly of housing member 28 to be lit. Light 82 when lit serves as a visible warning that the power to pump 16 has been cut off due to an interruption of water flow through conduit 26. It is to be understood that during the period float 60 causes contact 62 of the flow switch to shift from junction 66 into engagement with junction 72 and contact 78 in switch 76 engages junction 80 to red light 82, the current flow into time delay switch 52 will be maintained with contact 50 of the switch being held in engagement with junction 68. When the red warning light 82 is noticed and the power into control box 44 terminated, such as by a manual switch (not shown) located between the control box and the power supply source, to allow the flow blockage in the system to be corrected, the thermal element in time delay switch 52 will be allowed to cool to permit contact 50 thereof to be shifted under the influence of a spring or other biasing means out of engagement with junction 68 and into the position illustrated in FIG. 4. Simultaneously, the current into solenoid 74 of switch 76 is terminated with contact 78 thereof being urged by biasing means into the position illustrated in FIG. 4. Once the current flow into control box 44 is resumed, the operating cycle of the electrical control elements is repeated as above described.

Time delay switch 52 is utilized to isolate or bypass the operative function of flow switch 14 until, when utilizing overhead water supply 10, the system is purged of air, or, when utilizng a sub-level water supply 34, pump 16 is fully primed, after which switch 52 permits flow switch 14 to serve its operative flow monitoring function with contact 62 in engagement with juntion 66 of the switch.

In a system utilizing an overhead water supply 10, water valve 18, which is preferably of the solenoid actuated type and which may be connected into the electrical circuit of control box 44 as illustrated in FIG. 4, serves to isolate outlet conduit 32 and field 24 from overhead water supply 10 after pump 16 has been turned off. When utilizing one or more soil-moisture sensors 93 embedded in the ground around the crop area, leads 85 of the sensors are connected to junctions 86 and 92 with the jumper 84 shown in FIG. 4 extending between junctions 86 and 88 being removed and replaced by a jumper 90 which extends between junction 88 and the junction 92. Sensors 93 serve to turn pump 16 on and off depending upon the moisture content in the ground.

It is to be understood that the invention is not to be limited to the details above given but may be modified within the scope of the appended claims.

What I claim is:

1. A trickle irrigation system comprising a water supply source, a field of water discharge means for dispensing water from said supply source over the ground, a pump including an electrical motor actuating means and having an outlet and an inlet, conduit means placing said inlet in flow communication with said supply source, conduit means placing said outlet in flow communication with said field, an electrical power source, a first switch connecting said power source to said motor actuating means and having an "on" position causing said motor actuating means to be activated and an "off" position causing said motor acuating means to be deactivated, a second switch connecting said power source to said motor actuating means and including means responsive to the rate of water flow through said pump for deactivating said motor actuating means with said first switch in its "on" position when said water flow drops below a selected rate, and means for deactivating said second switch when said first switch is first shifted into its "on" position until there is water flow through said pump from said water supply source.

2. The irrigation system of claim 1 and warning means associated with said second switch for indicating a lack of water flow through said pump when said pump motor actuating means is deactivated by said second switch.

3. The irrigation system of claim 2 wherein said warning means is a light indicator.

4. The irrigation system of claim 3 and metering means for regulating the rate of water flow through said conduit means between said pump and field.

5. The irrigation system of claim 4 and timer means for maintaining said first switch in its "on" position for a selected period of time.

6. The irrigation system of claim 5 and a portable housing member resting upon said ground, said pump and said first and second switches and said second switch deactivating means and said metering means all located within said housing member.

7. The irrigation system of claim 4 wherein said first switch includes moisture-sensing means embedded in said ground for shifting said first switch into its "on" position as the moisture in said ground falls below a selected amount and for shifting said first switch into its "off" position as the moisture in said ground exceeds another selected amount.

* * * * *